US012460798B2

United States Patent
Zheng

(10) Patent No.: US 12,460,798 B2
(45) Date of Patent: Nov. 4, 2025

(54) TUBE BODY CONNECTING DEVICE INCLUDING FASTENING MECHANISM AND HOLES

(71) Applicant: JOININ GLOBAL PTE. LTD., Singapore (SG)

(72) Inventor: Hongbing Zheng, Hangzhou (CN)

(73) Assignee: JOININ GLOBAL PTE. LTD., Singapore (SG)

( * ) Notice: Subject to any disclaimer, the term of this patent is extended or adjusted under 35 U.S.C. 154(b) by 0 days.

(21) Appl. No.: 18/650,151

(22) Filed: Apr. 30, 2024

(65) Prior Publication Data

US 2025/0283589 A1    Sep. 11, 2025

(30) Foreign Application Priority Data

Mar. 11, 2024  (CN) .......................... 202420462261.4

(51) Int. Cl.
| | | |
|---|---|---|
| *F21V 21/005* | (2006.01) | |
| *A47B 96/14* | (2006.01) | |
| *F16B 7/04* | (2006.01) | |

(52) U.S. Cl.
CPC ........ *F21V 21/005* (2013.01); *A47B 96/1441* (2013.01); *F16B 7/0446* (2013.01)

(58) Field of Classification Search
CPC .. A47B 96/1441; F16B 7/0446; F21V 21/005
See application file for complete search history.

(56) References Cited

U.S. PATENT DOCUMENTS

| | | | | |
|---|---|---|---|---|
| 1,915,727 | A * | 6/1933 | Friedemann | A47F 5/10 248/125.3 |
| 3,599,911 | A * | 8/1971 | Monte | F21V 21/005 248/50 |
| 4,934,858 | A * | 6/1990 | Beaulieu | F16B 12/40 403/174 |
| 5,003,741 | A * | 4/1991 | Yeh | F21V 21/116 403/295 |
| 5,011,323 | A * | 4/1991 | Liuo | F16B 12/50 403/402 |
| 9,833,063 | B2 * | 12/2017 | Blick | B60B 33/04 |
| 10,154,720 | B2 * | 12/2018 | Yeung | A45D 40/06 |
| 10,299,588 | B1 * | 5/2019 | Lai | A47B 95/00 |
| 10,393,329 | B2 * | 8/2019 | Germain | F21V 21/005 |
| 10,753,554 | B2 * | 8/2020 | Jiang | F21V 21/22 |

(Continued)

*Primary Examiner* — Keith G. Delahoussaye
(74) *Attorney, Agent, or Firm* — IPRTOP LLC

(57) ABSTRACT

The tube body connecting device includes tube bodies and a fastening mechanism arranged in the tube bodies; the tube bodies include a first tube body and a second tube body; the second tube body is provided with second tube body holes, and the fastening mechanism is provided with fastening holes; the first tube body is connected to a first end of the fastening mechanism, and the second tube body is connected to a second end. The tube body connecting device narrows the gap between the tube bodies, improves the connection strength of the tube bodies, and ensures the two tube bodies connected along the same axis, thus providing a smooth connection. By simply inserting the fastening mechanism, a whole lighting machine can be obtained, which is easy to disassemble. Moreover, the structure of this device and the fittings can be adjusted, making it versatile, with a wide range of applications.

8 Claims, 7 Drawing Sheets

(56) References Cited

U.S. PATENT DOCUMENTS

| | | | | |
|---|---|---|---|---|
| 11,641,924 B2* | 5/2023 | Yan | A45D 40/06 206/385 |
| 2005/0254201 A1* | 11/2005 | Olmsted | G05B 9/02 361/637 |
| 2005/0265778 A1* | 12/2005 | Tzeng | F16B 12/52 403/231 |
| 2006/0158877 A1* | 7/2006 | Lanczy | F21V 21/005 362/217.17 |
| 2009/0175678 A1* | 7/2009 | Nientiedt | F16B 12/44 403/171 |
| 2012/0301215 A1* | 11/2012 | Huang | A47B 47/0016 403/176 |
| 2013/0294810 A1* | 11/2013 | Chan | A45D 40/06 401/75 |
| 2013/0306808 A1* | 11/2013 | Huang | A47B 13/06 248/163.1 |
| 2015/0144760 A1* | 5/2015 | Paradiso | F16M 13/022 248/534 |
| 2015/0250290 A1* | 9/2015 | Holloway | A45D 40/06 401/31 |
| 2016/0290619 A1* | 10/2016 | Galloppa | F21V 23/06 |
| 2017/0356178 A1* | 12/2017 | Corbett | E04B 1/34315 |
| 2018/0356032 A1* | 12/2018 | Crider | F16M 11/046 |
| 2019/0086062 A1* | 3/2019 | Esteves | F21V 21/005 |
| 2021/0047059 A1* | 2/2021 | Chiang | B65B 7/2842 |
| 2021/0148531 A1* | 5/2021 | Donnelly | F21S 8/061 |
| 2022/0074578 A1* | 3/2022 | Ni | F21S 2/00 |
| 2023/0279885 A1* | 9/2023 | Soytürk | A47B 96/068 211/186 |

\* cited by examiner

TUBE BODY CONNECTING DEVICE INCLUDING FASTENING MECHANISM AND HOLES

FIELD OF THE INVENTION

The present disclosure relates to the technical field of light fixture installation, in particular to a tube body connecting device.

BACKGROUND OF THE INVENTION

Lamps and lanterns have a wide range of applications in daily life, and typically the light fixture installation is realized through the straight-line connection of different fittings, such as floor lamps, chandeliers, etc. Specifically, most of the lamps and lanterns on the market at present have a larger volume after package, in order to reduce the cost of transportation, the lamps and lanterns are knocked down (KD) for transportation, and the methods are as follows.
  (1) The first one involves using tubes with different cross-section sizes, inserting the tube with a smaller size into the tube with a larger size, and connecting the tubes through screws located laterally.
  (2) The second one involves using two smaller tubes with the same cross-section sizes; inserting one of the above smaller tubes partially into a first end of a larger tube and performing welding to connect this smaller tube and the larger tube; inserting the other one of the smaller tubes partially into a second end of the larger tube, and then connecting this smaller tube and the larger tube through screws.
  (3) The third one involves using tubes with the same cross-section sizes, and providing a piece or two pieces of iron sheet symmetrically arranged outside the tubes to realize the connection.

However, the above methods have the following problems:
  (1) in the first method, tubes with two different sizes are required;
  (2) in the second method, welding is performed on the outer surface at the tube opening, which tends to cause undercut, weld bead, concavity, weld deformation, and other defects, resulting in a significant reduction in the load-bearing capacity of the tube body, thus causing safety problems; at the same time, for lighting products, these defects will also affect the appearance;
  (3) in the third method, the two connected tubes cannot be assured to be on a straight line, and the connection strength cannot be guaranteed.

Therefore, during the installation process, when the tube bodies have different sizes, it may affect the quality of connection and installation; the welding performed on the outer surface of the tubes may cause defects that lead to a significant reduction in the bearing capacity of the tube bodies, thus causing safety problems; and the two connected tubes cannot be assured to be on a straight line, which leads to insufficient connection strength of the structures; since it cannot be guaranteed that the two connected tube bodies share the same axis, the strength of the lighting structure is reduced, causing safety problems.

SUMMARY OF THE INVENTION

The present disclosure provides a tube body connecting device, used to solve the problems of the connection and installation quality affected by the different sizes of the tube bodies, safety issues caused by the significantly reduced load-bearing capacity resulting from welding defects on the outer surface of the tube bodies, and insufficient connection strength of the connecting structures due to that the connected two tube bodies cannot share the same axis, reduced strength of the lighting structures, and other technical issues.

The present disclosure provides a tube body connecting device. The tube body connecting device includes tube bodies and a fastening mechanism arranged in the tube bodies. The tube bodies include a first tube body and a second tube body connected to the first tube body through the fastening mechanism. The second tube body is provided with second tube body holes, the fastening mechanism is provided with fastening holes, the first tube body is connected to the first end of the fastening mechanism, and the second tube body is connected to the second end of the fastening mechanism through the second tube body holes and the fastening holes.

In an embodiment of the present disclosure, the first tube body is provided with first tube body holes, the first end of the fastening mechanism is provided with fixed-connection holes, and the first tube body is connected to the first end of the fastening mechanism through the first tube body holes and the fixed-connection holes.

In an embodiment of the present disclosure, the first end of the fastening mechanism is inserted into the first tube body; and the first tube body and the fastening mechanism are fixedly connected by welding at the first tube body holes.

In an embodiment of the present disclosure, a cross-section of the first tube body matches a cross-section of the first end of the fastening mechanism.

In an embodiment of the present disclosure, the number of the second tube body holes is no less than two; and the number of the fastening holes is no less than two. The number and position of the second tube body holes correspond to the number and position of the fastening holes.

In an embodiment of the present disclosure, the second tube body includes second tube body sidewalls, where each two adjacent sidewalls of the second tube body sidewalls are connected to each other, and the second tube body holes are provided on one of the second tube body sidewalls.

In an embodiment of the present disclosure, the second tube body includes second tube body sidewalls, where each two adjacent sidewalls of the second tube body sidewalls are connected to each other, and the second tube body holes are provided on at least two of the second tube body sidewalls.

In an embodiment of the present disclosure, a cross-section of the second tube body matches a cross-section of the second end of the fastening mechanism.

In an embodiment of the present disclosure, the second tube body and the second end of the fastening mechanism are detachably connected by the second tube body holes and the fastening holes.

In an embodiment of the present disclosure, the second tube body and the second end of the fastening mechanism are in a threaded connection.

As described above, the tube body connecting device in the present disclosure has the following beneficial effects.

The tube body connecting device provided in the present disclosure can precisely align the holes of the first tube body and the second tube body with the holes of the fastening mechanism, thus ensuring a rapid assembly of the two tube bodies. In addition, the fastening mechanism can tightly connect the first and the second tube bodies, and can ensure the two tube bodies are located along the same axis, achieving a smooth connection. By simply inserting the fastening mechanism into the two tube bodies, a complete lighting machine can be obtained, which is easy to disassemble. The tube body connecting device provided in the present disclosure further provides a simple, labor-saving, cost-saving connection method, and moreover, because the fastening mechanism is designed inside the tubes, it makes the connecting portion of the tubes more minimalist and aesthetically pleasing.

The tube body connecting device in the present disclosure narrows the gap between the two tube bodies and improves the connection strength of the tube bodies.

The tube body connecting device in the present disclosure can quickly realize the assembly of two tube bodies without changing the main structure and appearance, reduce the volume, reduce the cost of product transportation, and improve the customer experience. Moreover, the structure of this device as well as the fittings can be adjusted according to the changes in the cross-sectional size of the tube bodies, making it versatile, with a wide range of applications.

REFERENCE NUMERALS

Figure 1:
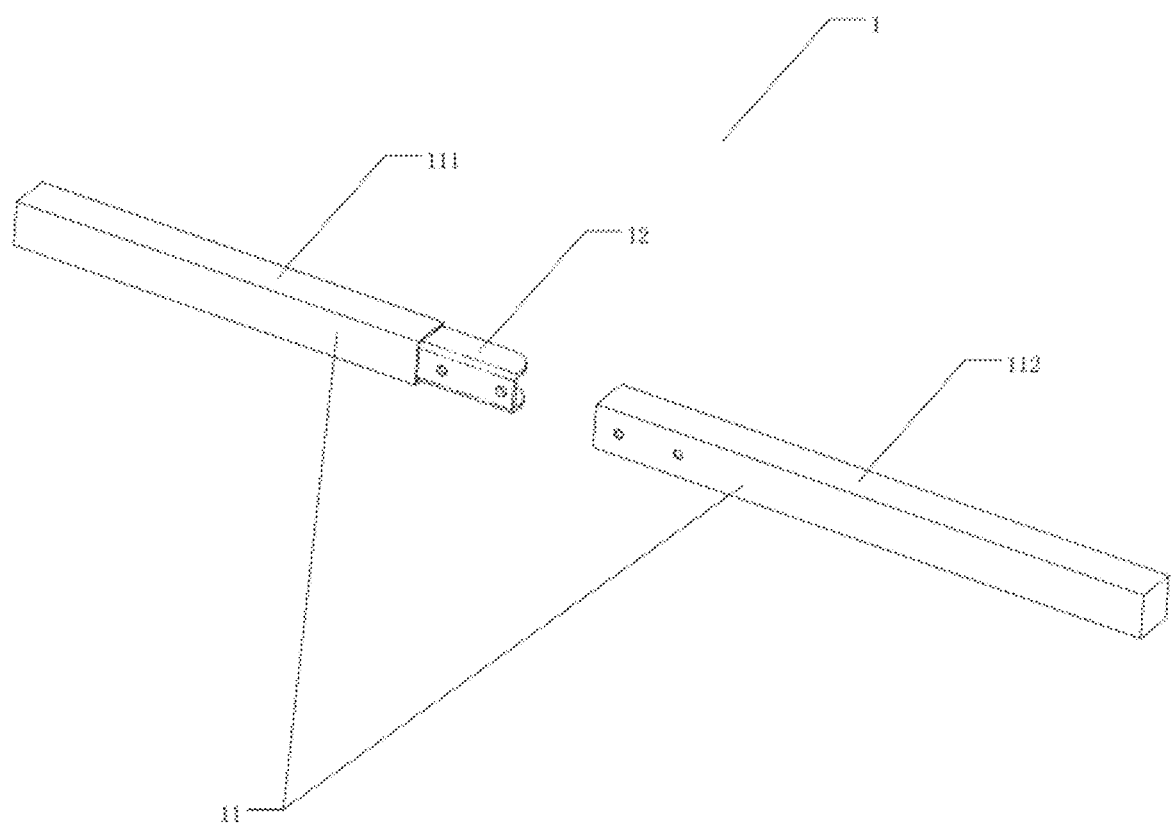
FIG. 1 shows a schematic diagram of an overall structure of a tube body connecting device according to an embodiment of the present disclosure.

1 Tube body connecting device
11 Tube body
12 Fastening mechanism
111 First tube body
112 Second tube body
121 First sidewall
122 Second sidewall
123 Fastening bottom surface
124 Fastening hole
12A First fastening mechanism
12B Second fastening mechanism
112A Second tube body A
112B Second tube body B
1111 First tube body hole
1112 First tube body sidewall
1121 Second tube body hole
1122 Second tube body sidewall
1241 First fastening hole
1242 Second fastening hole
1111A First hole of first tube body
1111B Second hole of first tube body
1111C Third hole of first tube body
1111D Fourth hole of first tube body
1112A First sidewall of first tube body
1112B Second sidewall of first tube body
1112C Third sidewall of first tube body
1112D Fourth sidewall of first tube body
1121A First hole of second tube body
1121B Second hole of second tube body
1122A First sidewall of second tube body
1122B Second sidewall of second tube body
1122C Third sidewall of second tube body
1122D Fourth sidewall of second tube body
2 Laser marking line
3 Lamp

DETAILED DESCRIPTION OF THE INVENTION

The present disclosure is further described below in conjunction with the accompanying drawings; however, the protection scope of the present disclosure is not limited to the description below.

The embodiments of the present disclosure are illustrated by the following specific examples, and those skilled in the art can readily understand other advantages and efficacies of the present disclosure from the contents disclosed in this specification. The present disclosure may be implemented or applied in various other specific embodiments, and the details in the present disclosure may be modified or altered based on different views and applications without departing from the spirit of the present disclosure. It should be noted that the following embodiments and features in the embodiments may be combined without conflict.

It should also be noted that the following embodiments are only schematically to illustrate the basic concept of the present disclosure, therefore, the components related to the present disclosure are not drawn in accordance with the number, shape, and size of the components in the actual implementation, the shape, number, and proportion of the components in the actual implementation may be changed arbitrarily, and the layout of the components may also be more complicated.

The following embodiments of the present disclosure provide a tube body connecting device, which solves connection and installation problems of two tube bodies with different sizes, unsatisfactory overall appearance due to the welding at the tube opening, as well as the insufficient connection strength between the structures due to the fact that the two connected tube bodies cannot form a straight line, and reduced strength of the lighting structures, and safety and other technical problems due to the two connected tubes not being on the same axis.

Embodiments of the present disclosure provide a tube body connecting device, which can quickly realize the assembly of two tube bodies without changing the main structure and appearance, thus reducing the volume and the cost of product transportation, and improving the customer experience. At the same time, the tube body connecting device provided in the present disclosure narrows the gap between the tube bodies when they are connected and improves the connection strength of the tube bodies, so that the two tube bodies can be smoothly connected along the same axis, and easy disassembly and assembly are realized. The present disclosure restricts the structures so that the two tube bodies can be precisely aligned with the holes, thus ensuring the rapid assembly of the two tube bodies.

The principle of a tube body connecting device of the present disclosure will be elaborated in detail in the following embodiments in conjunction with the accompanying drawings.

Figure 2:
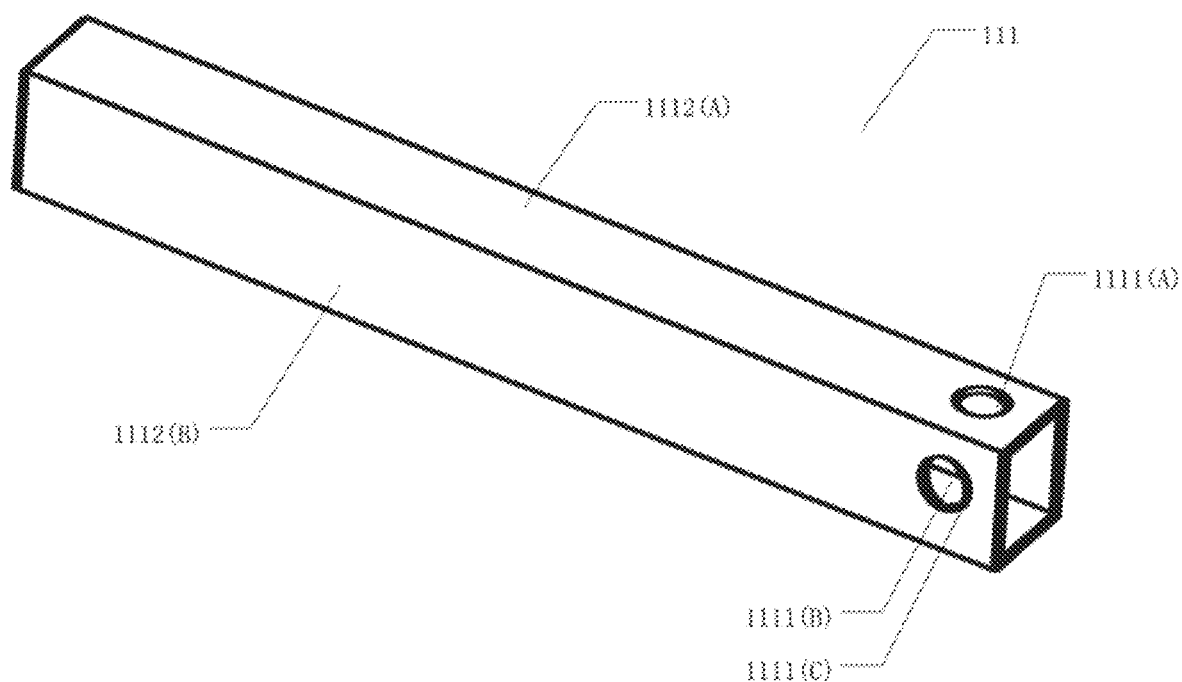
FIG. 2 shows a schematic diagram of a three-dimensional structure of a first tube body according to an embodiment of the present disclosure.

FIG. 1 shows a schematic diagram of an overall structure of a tube body connecting device according to an embodiment of the present disclosure, and FIG. 2 shows a schematic diagram of a three-dimensional structure of a first tube body according to an embodiment of the present disclosure. As shown in FIGS. 1 to 4, the tube body connecting device 1 includes two tube bodies 11 and a fastening mechanism 12 disposed within the tube bodies. The tube bodies 11 includes a first tube body 111 and a second tube body 112 connected to the first tube body 111 by the fastening mechanism 12. The second tube body 112 is provided with several second tube body holes 1121 and the fastening mechanism 12 is provided with several fastening holes 124. The first tube body 111 is connected to a first end of the fastening mechanism 12, and the second tube body 112 is connected to a second end of the fastening mechanism 12 through the second tube body holes 1121 and the fastening holes 124. When the tubes are connected in this way, rapid assembly of two tube bodies without changing the main structure and appearance can be realized, which does not occupy the volume other than the tube bodies, reduces the cost of product transportation, and improves the customer's experience.

In an embodiment of the present disclosure, the first tube body 111 is provided with multiple first tube body holes 1111, the first end of the fastening mechanism 12 is provided with fixed-connection holes, and the first tube body 111 and the first end of the fastening mechanism 12 are connected through the first tube body holes 1111 and the fixed-connection holes.

In an embodiment of the present disclosure, the first end of the fastening mechanism 12 is inserted into the first tube body 111, the fastening mechanism 12 and the first tube body 111 are both made of metal, and welding is performed at the first tube body holes 1111 to fixedly connect the first tube body 111 and the fastening mechanism 12. The connection strength of the tube bodies can be effectively improved by welding.

In addition, the first end of the fastening mechanism 12 may also be interposed in the first tube body 111 through a screw connection, a buckle connection, or the like. For example, when the screw connection is adopted, a number of screwing holes may be provided on the sidewalls of the fastening mechanism 12 and the first tube body 111, respectively, the spacing of the screwing holes on the fastening mechanism 12 is the same as the spacing of the holes (i.e., first tube body holes) on the first tube body sidewall 1112, and after aligning the screwing holes with the first tube body holes 1111, the fastening mechanism 12 is fixedly connected to the first tube body 111 through screws. When the buckle connection is adopted, a buckle is arranged on the first tube body 111, and a buckle hole is formed on the fastening mechanism 12 (or the buckle is arranged on the fastening mechanism 12 and the buckle hole is formed on the first tube body 111), the fastening mechanism 12 is inserted into the first tube body 111 and the buckle is pushed to the buckle hole for connection, so that the first tube body 111 is fixedly connected to the fastening mechanism 12, effectively improving the connection strength of the first tube body 111 and the fastening mechanism 12. The buckle hole and the screwing holes may be collectively referred to as fixed-connection holes.

In an embodiment of the present disclosure, the cross-section of the first tube body 111 matches the cross-section of the first end of the fastening mechanism 12, and the cross-section of the second tube body 112 matches the cross-section of the second end of the fastening mechanism 12. When two tube bodies have the same cross-sections, the two tube bodies can be connected along the same axis.

In an embodiment of the present disclosure, the cross-section of the tube bodies is rectangular. When the cross-section of the tube bodies is rectangular, the tube bodies are rectangular.

In an embodiment of the present disclosure, when the tube bodies are rectangular, the first tube body 111 includes multiple first tube body sidewalls 1112, and the first tube body 111 is provided with multiple first tube body holes 1121.

Specifically, the first tube body holes 1111 are provided at a first end of the first tube body sidewalls 1112, and the number of the first tube body holes 1111 is not less than one. The cross-section of the first tube body 111 and the cross-section of the second tube body 112 are identical in size, shape, and so on.

In this embodiment, the first tube body holes 1111 are provided at a first end of the first tube body 111. The first tube body holes 1111 include a first hole of first tube body 1111A, a second hole of first tube body 1111B, a third hole of first tube body 1111C, and a fourth hole of first tube body 1111D. The first tube body sidewalls 1112 include a first sidewall of first tube body 1112A, a second sidewall of first tube body 1112B, a third sidewall of first tube body 1112C, and a fourth sidewall of first tube body 1112D.

Specifically, the number of the first tube body holes 1111 is preferably four, so that each sidewall of the rectangular tube body is provided with one first tube body hole 1111. That is, the first hole of first tube body 1111A is provided on the first end of the first sidewall of first tube body 1112A, the second hole of first tube body 1111B is provided on the first end of the second sidewall of first tube body 1112B, the third hole of first tube body 1111C is provided on the first end of the third sidewall of first tube body 1112C, and the fourth hole of first tube body 1111D is provided on the first end of the fourth sidewall of first tube body 1112D.

Further, the distances from the first hole of first tube body 1111A, the second hole of first tube body 1111B, the third hole of first tube body 1111C, and the fourth hole of first tube body 1111D to an end where the first tube body 111 and the second tube body 112 are connected, can be adjusted according to user requirements and installation requirements, respectively.

When the number of the first tube body holes 1111 is preferably two, the two first tube body holes 1111 are provided on two sidewalls of the rectangular tube body. For example, the first hole of first tube body 1111A is provided at the first end of the first sidewall of first tube body 1112A, and the second hole of first tube body 1111B is provided at the first end of the second sidewall of first tube body 1112B. Further, the first hole of first tube body 1111A and the second hole of first tube body 1111B are then aligned with the fixed-connection holes, respectively.

It should be noted that the first tube body holes 1111 are provided on the sidewalls of the first tube body, and the first tube body 111 is not limited to a rectangular tube body; a triangular tube body, a cylindrical tube body, a polygonal tube body, and the like are also applicable.

In an embodiment of the present disclosure, the second tube body 112 includes multiple second tube body sidewalls 1122, and the second tube body 112 is provided with several second tube body holes 1121.

In an embodiment of the present disclosure, the number of the second tube body holes 1121 is no less than two, when the second tube body 112 is connected to the fastening mechanism 12, the number and position of the second tube body holes 1121 are the same as those of the fastening holes 124.

Specifically, the second tube body holes 1121 may be provided in the following two ways. In the first way, the second tube body 112 includes multiple second tube body sidewalls 1122, each two adjacent sidewalls of the second tube body sidewalls 1122 are connected to each other, and the second tube body holes 1121 are provided on one of the sidewalls of the second tube body 112. In the second way, the second tube body 112 includes multiple second tube body sidewalls 1122, each two adjacent sidewalls of the second tube body sidewalls 1122 are connected to each other, and the second tube body holes 1121 are provided on at least two sidewalls of the second tube body 112.

Figure 3:
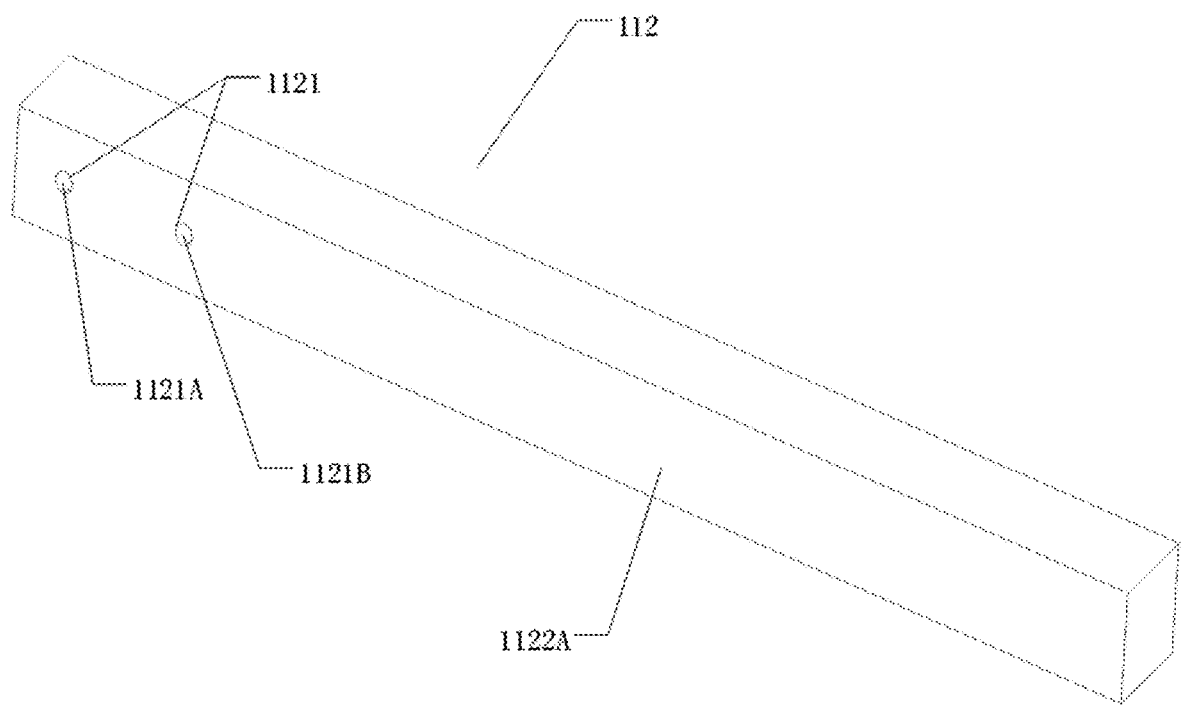
FIG. 3 shows a schematic diagram of a cross-section structure of a second tube body according to an embodiment of the present disclosure.

The following takes a rectangular tube as an example for illustration. FIG. 3 shows a schematic diagram of a cross-section structure of the second tube body according to an embodiment of the present disclosure.

In this embodiment, the number of the second tube body holes 1121 is preferably two. The second tube body holes 1121 are provided on the second tube body sidewalls 1122, and the second tube body holes 1121 include a first hole of second tube body 1121A and a second hole of second tube body 1121B. The first hole of second tube body 1121A and the second hole of second tube body 1121B are both provided on one sidewall of the second tube body 112. The distance between the first hole of second tube body 1121A and the second hole of second tube body 1121B is the same as that of the fastening holes 124 and the positions of the first hole of second tube body 1121A and the second hole of second tube body 1121B correspond to those of the fastening holes 124.

In another embodiment, the second tube body holes 1121 are provided on at least two sidewalls of the second tube body 112, respectively, the number of the second tube body holes 1121 is the same as the number of the fastening holes 124, the spacing between the second tube body holes 1121 is the same as that of the fastening holes 124, and the positions of the second tube body holes 1121 correspond to those of the fastening holes 124.

In this embodiment, the second tube body sidewalls 1122 include a first sidewall of second tube body 1122A, a second sidewall of second tube body 1122B, a third sidewall of second tube body 1122C, and a fourth sidewall of second tube body 1122D.

Specifically, the two second tube body holes 1121 are preferably located on the same sidewall. The first hole of second tube body 1121A and the second hole of second tube body 1121B are both provided on the same sidewall of the second tube body 112. As can be seen, the first hole of second tube body 1121A and the second hole of second tube body 1121B may be provided on any sidewall of the second tube body 112.

In an embodiment of the present disclosure, the second tube body 112 and the second end of the fastening mechanism 12 are detachably connected through the second tube body holes 1121 and the fastening holes 124. The second tube body 112 and the second end of the fastening mechanism 12 are in a threaded connection, which is convenient for disassembly and improves the customer experience.

In this embodiment, other connections may also be adopted, such as a buckle connection. Specifically, at least one buckle is provided on the second tube body 112, meanwhile, at least one buckle hole is provided at the second end of the fastening mechanism 12. The number of the buckles is the same as that of the buckle holes, and the positions of the buckles correspond to those of the buckle holes. During installation, the second end of the fastening mechanism 12 is aligned with the tube opening of the second tube body 112, the second end of the fastening mechanism 12 is inserted into the second tube body 112, at which time an elastic deformation occurs, the buckle is then pushed to the buckle hole to complete a fixed connection between the second tube body 112 and the second end of the fastening mechanism 12, thereby fixedly connecting the second tube body 112 to the second end of the fastening mechanism 12.

It should be noted that the positions of the buckle and the buckle hole can be adjusted according to the use demand, and the buckle may be arranged on the fastening mechanism 12 and the buckle hole may be arranged on the second tube body. The elements of the buckle structure may be specifically adjusted according to the installation situation, for example, buckles and protrusions on the sidewalls can be provided to accomplish the buckle connection.

Figure 4:
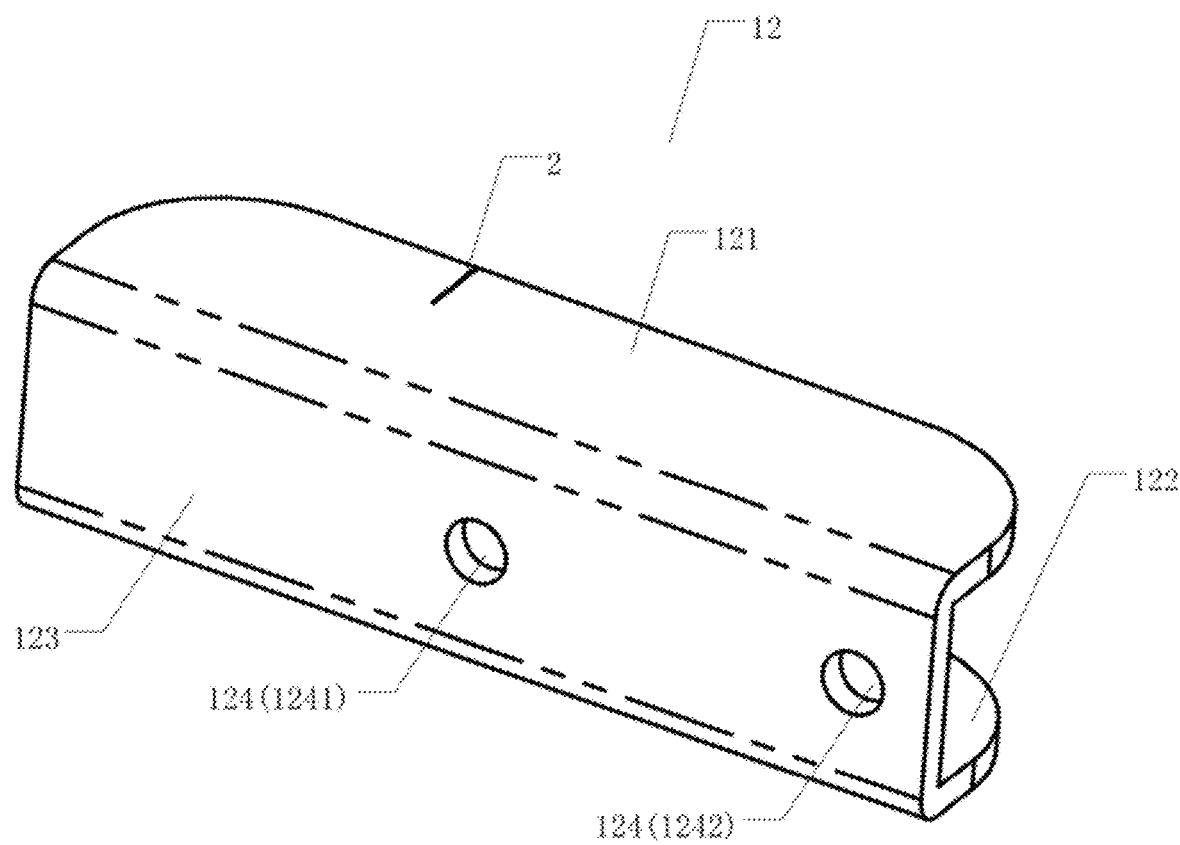
FIG. 4 shows a schematic diagram of a three-dimensional structure of a fastening mechanism according to an embodiment of the present disclosure.

FIG. 4 shows a schematic diagram of a three-dimensional structure of the fastening mechanism according to an embodiment of the present disclosure. The fastening mechanism is used to connect the first tube body 111 and the second tube body 112.

In this embodiment, the fastening mechanism 12 is preferably a member having a U-shaped cross-section. The U-shaped structure allows the two tube bodies to connect along the same axis, thus achieving a smooth connection, a convenient connection, and a complete lighting machine can be obtained for use by simply inserting the fastening mechanism 12, and the disassembly is also convenient. The fastening mechanism 12 is fixedly disposed in the first tube body 111 and is fixedly connected to the second tube body 112 through threads. The fastening mechanism 12 includes: a first sidewall 121, a second sidewall 122, and a fastening bottom surface 123, the first sidewall 121 is parallel to the second sidewall 122, and the fastening bottom surface 123 is provided with fastening holes 124.

Further, taking the second tube body holes 1121 being on the same sidewall as an example, the two fastening holes 124 corresponding to the second tube body holes 1121 are also on the same side wall (i.e., fastening bottom surface 123). The fastening holes 124 include a first fastening hole 1241 and a second fastening hole 1242. The first fastening hole 1241 and the second fastening hole 1242 are both provided on the fastening bottom surface 123, the first fastening hole 1241 and the second fastening hole 1242 are spaced apart along a direction parallel to the first sidewall 121, and the distance between the first fastening hole 1241 and the second fastening hole 1242 is equal to the distance between the two second tube body holes 1121.

For example, the two fastening holes 124 are the first fastening hole 1241 and the second fastening hole 1242, respectively. These two fastening holes 124 correspond to the two second tube body holes 1121 of the second tube body 112. That is, the distance between the two fastening holes 124 is the same as the distance between the two holes on the second tube body 112. The position restriction is made here to allow the two fastening holes 124 to be aligned one by one with the two holes on the second tube body 112.

Therefore, in this embodiment, the first tube body 111 and the second tube body 112 connected by the U-shaped member are along the same axis to facilitate a smooth connection in which a complete lighting machine can be obtained by simply inserting the U-shaped member as well as an easy disassembly.

It is to be noted that the tube body 11 and the fastening mechanism 12 can be made of any suitable material. In addition, the U-shaped opening of the fastening mechanism 12 has rounded corners. With these rounded corners, burrs at the tube opening of the tube body 11 can be avoided and the fastening mechanism can be easily inserted into the second tube body.

In this embodiment, after the fastening mechanism 12 is inserted into the first tube body 111, welding is performed, so that the fastening mechanism 12 is fixedly disposed in the first tube body 111. Then, the fastening mechanism 12 is inserted into the second tube body 112, so that the second tube holes 1121 of the second tube body 112 are aligned with the fastening holes 124 of the fastening mechanism 12. The installation of the first tube body 111 and the second tube body 112 can be completed by screws.

It is to be noted that the tube bodies 11 may have different cross-sectional shapes, such as rectangular (square), round, triangular, polygonal, and the like. The cross-sectional shapes of tube bodies 11 are not limited to these as long as the first tube body 111 and the second tube body 112 can be tightly connected by the fastening mechanism 12, respectively.

The following is a detailed description of the installation process of a tube body connecting device, where the tube bodies have rectangular cross-sections.

Figure 5:
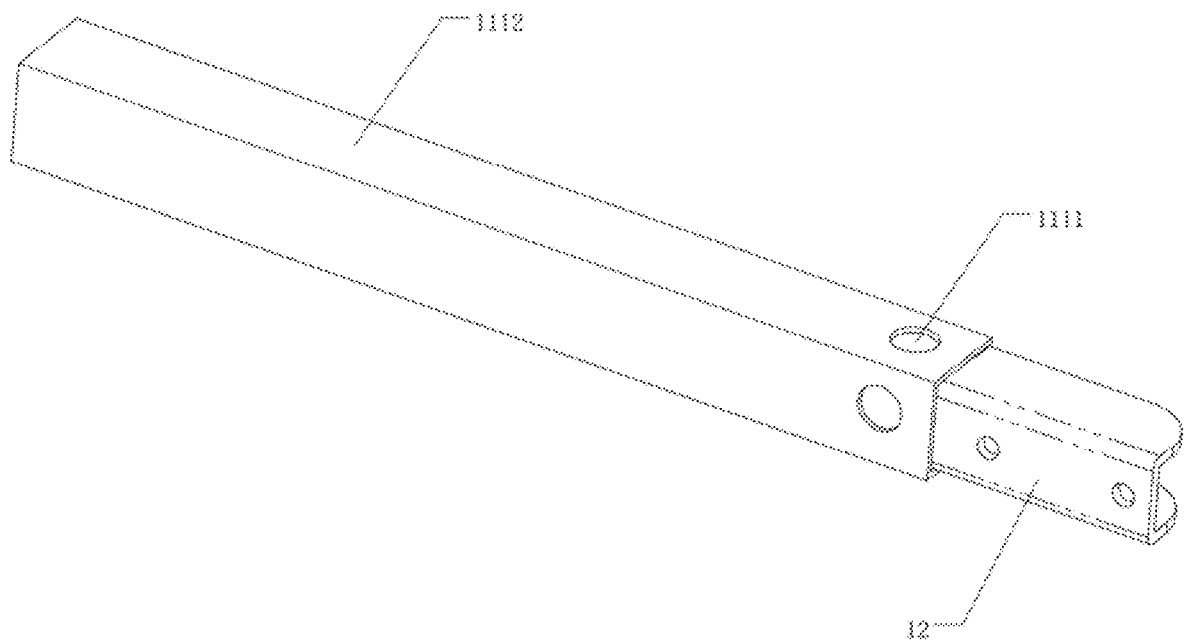
FIG. 5 shows a schematic diagram where the first tube body is clamped with the fastening mechanism according to an embodiment of the present disclosure.
Figure 6:
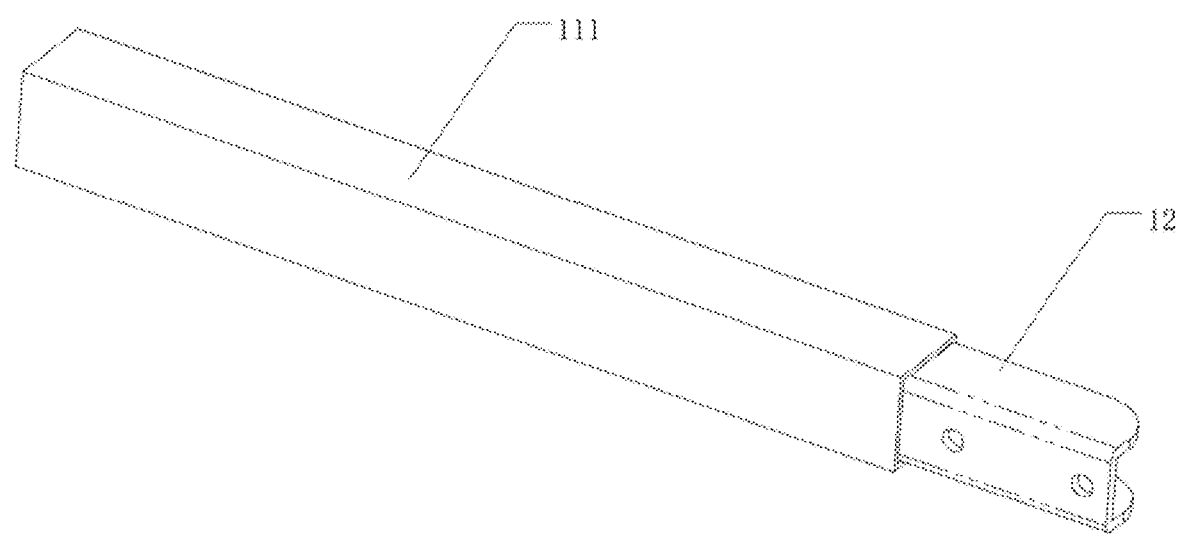
FIG. 6 shows a schematic diagram where welding is performed after the first tube body is clamped with the fastening mechanism according to an embodiment of the present disclosure.
Figure 7:
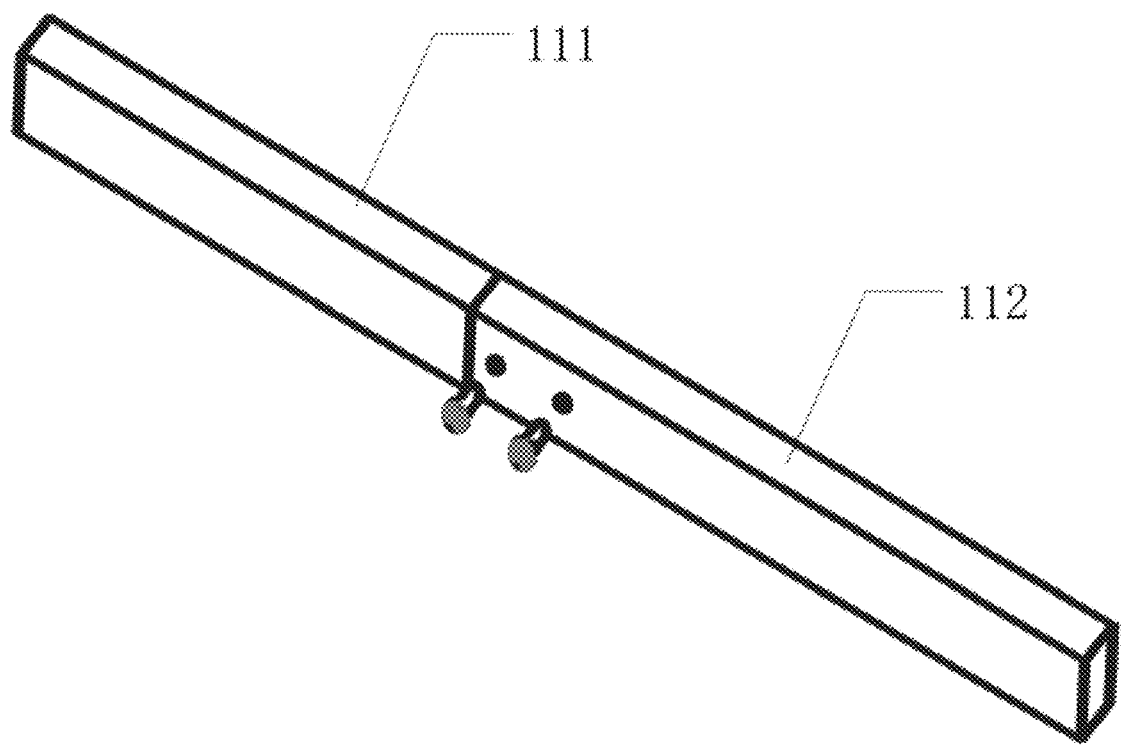
FIG. 7 shows a schematic diagram where the first tube body is clamped with a second tube body.
Figure 8:
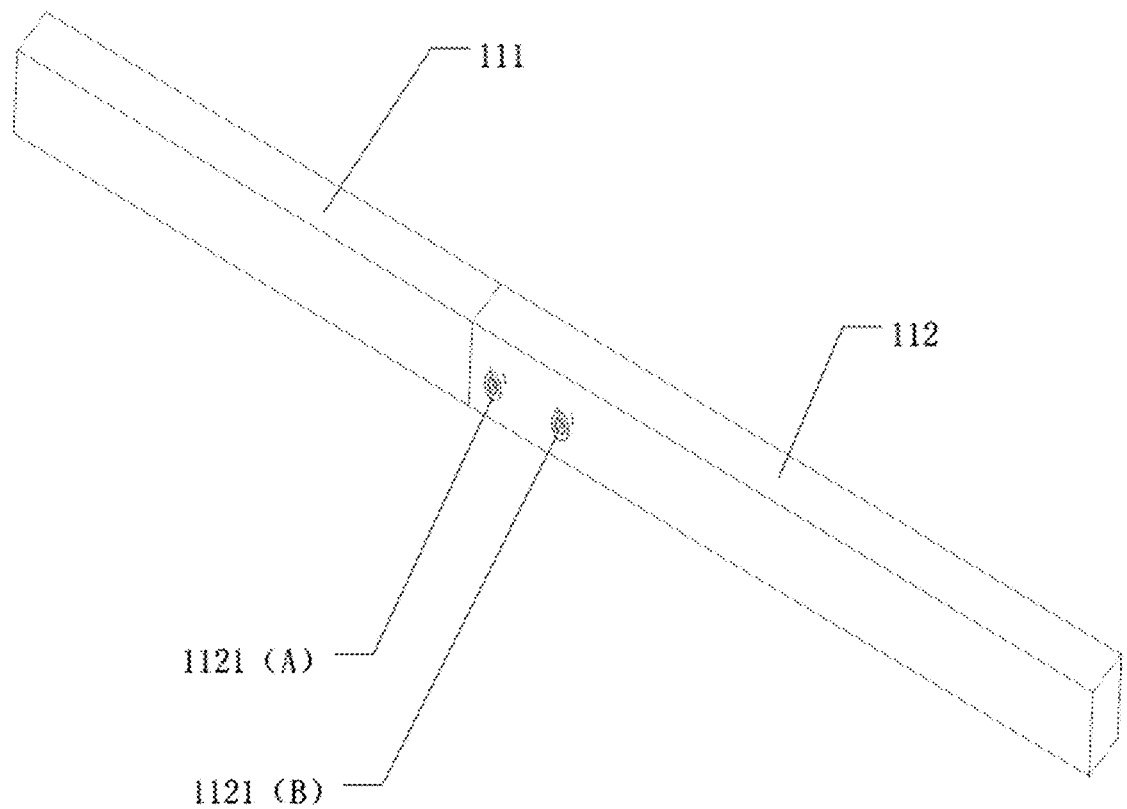
FIG. 8 shows a schematic structural diagram of the tube body connecting device after the installation is completed according to an embodiment of the present disclosure.

FIG. 5 shows a schematic diagram where the first tube body is clamped with the fastening mechanism according to an embodiment of the present disclosure, FIG. 6 shows a schematic diagram where welding is performed after the first tube body is clamped with the fastening mechanism according to an embodiment of the present disclosure, FIG. 7 shows a schematic diagram where the first tube body is clamped with a second tube body according to an embodiment of the present disclosure, and FIG. 8 shows a schematic structural diagram of the tube body connecting device after the installation is completed according to an embodiment of the present disclosure.

Three holes are provided on the first tube body 111, namely: the first hole of first tube body 1111A, the second hole of first tube body 1111B, and the third hole of first tube body 1111C. Specifically, each of the three sidewalls of the first tube body 111 is provided with a hole, and the distances from the three holes to the opening at one end of the first tube body 111 are the same. That is, position restrictions are well performed on the first tube body 111.

A laser marking line 2 is provided on the first sidewall 121 of the fastening mechanism 12 according to the user's demand. Meanwhile, a number of fastening holes 124 are provided on the fastening bottom surface 123. In this embodiment, the number of the fastening holes 124 is preferably two, namely: the first fastening hole 1241 and the second fastening hole 1242.

Then, the U-shaped fastening mechanism is inserted into the first tube body 111 (with its sidewalls partially exposed by the first tube body holes), and the laser marking line 2 of the U-shaped fastening mechanism 12 is flush with the opening of the first tube body 111. Welding is performed at the first hole of first tube body 1111A, the second hole of first tube body 1111B, and the third hole of first tube body 1111C, respectively, to connect the first tube body 111 with the fastening mechanism 12, and after the welding is completed, the welding scars at these three holes are polished and flattened.

Punching is performed on a sidewall at one end of the second tube body 112 to provide the first hole of second tube body 1121A and the second hole of second tube body 1121B, respectively, where the second tube body 112 has the same cross-section as the first tube body 111. The diameter of the first hole of second tube body 1121A and the second hole of second tube body 1121B is 5 mm, and the spacing between the first hole of second tube body 1121A and the second hole of second tube body 1121B is one inch.

The end of the fastening mechanism 12 with fastening holes is connected to the end of the second tube body 112 with holes, and then the end of the fastening mechanism 12 with fastening holes is inserted into the second tube body 112 until the first fastening hole 1241 is aligned with the first hole of second tube body 1121A, and the second fastening hole 1242 is aligned with the second hole of second tube body 1121B. Suitable screws are then selected to secure the second tube body 112 to the fastening mechanism 12, so as to complete the connection of the rectangular tubes.

The following is a detailed description of the installation process of a tube body connecting device, where the tube bodies have circular cross-sections.

Three holes are provided on the first tube body 111, namely: the first hole of first tube body 1111A, the second hole of first tube body 1111B, and the third hole of first tube body 1111C. All three holes are located at the first end of the cylindrical tube body.

According to the user's demand, the fastening mechanism 12 with a U-shaped or circular cross-section may be used. Taking the U-shaped structure as an example. A laser marking line 2 is provided on the first sidewall 121 of the fastening mechanism 12. Meanwhile, two fastening holes 124 are provided on the fastening bottom surface 123, namely: the first fastening hole 1241 and the second fastening hole 1242.

Then, the U-shaped fastening mechanism is inserted into the first tube body 111 until the laser marking line 2 of the U-shaped fastening mechanism 12 is flush with the opening of the first tube body 111. This position restriction facilitates the alignment. Welding is performed at the first hole of first tube body 1111A, the second hole of first tube body 1111B, and the third hole of first tube body 1111C, respectively, and after the welding is completed, the welding scars at these three holes are polished and flattened.

Punching is performed on a sidewall at the first end of the second tube body 112 to provide the first hole of second tube body 1121A and the second hole of second tube body 1121B, respectively, where the second tube body 112 has the same circular cross-section as the first tube body 111.

The second end of the fastening mechanism 12 is connected to the first end of the second tube body 112, and then the fastening mechanism 12 is inserted into the second tube body 112 until the first fastening hole 1241 is aligned with the first hole of second tube body 1121A, and the second fastening hole 1242 is aligned with the second hole of second tube body 1121B. Suitable screws are then selected to secure the second tube body 112 to the fastening mechanism 12, so as to complete the connection of the circular tubes.

The installation process of the overall light fixture is described below.

Figure 9A:
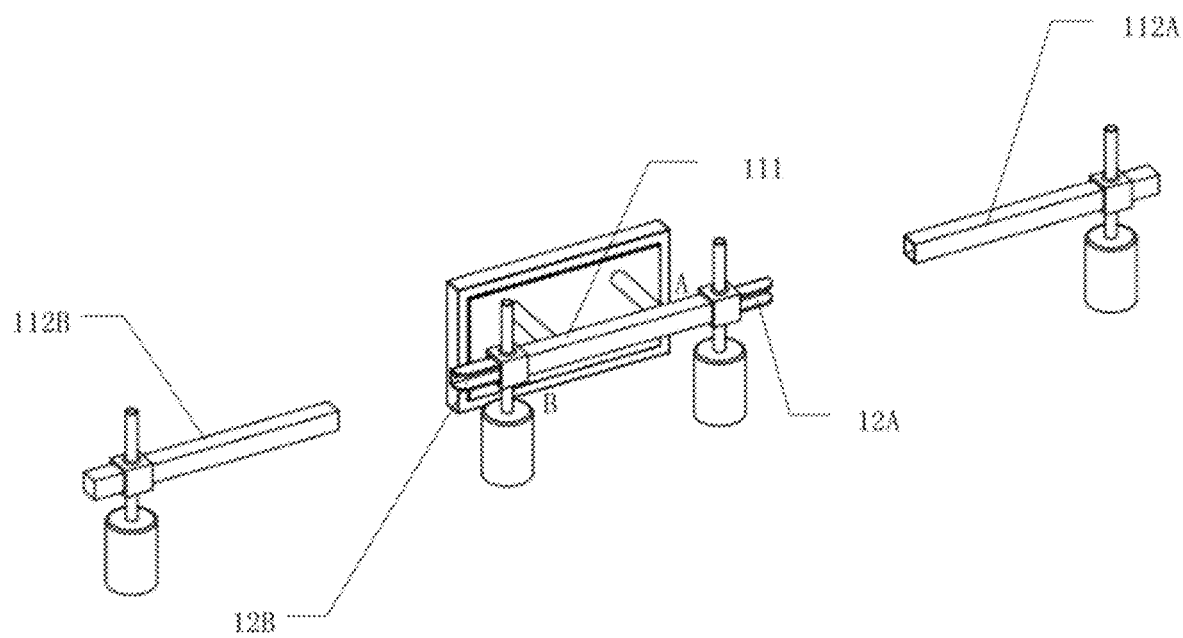
FIG. 9A shows a schematic structural diagram of the tube body connecting device in a frontal view before installation according to an embodiment of the present disclosure.
Figure 9B:
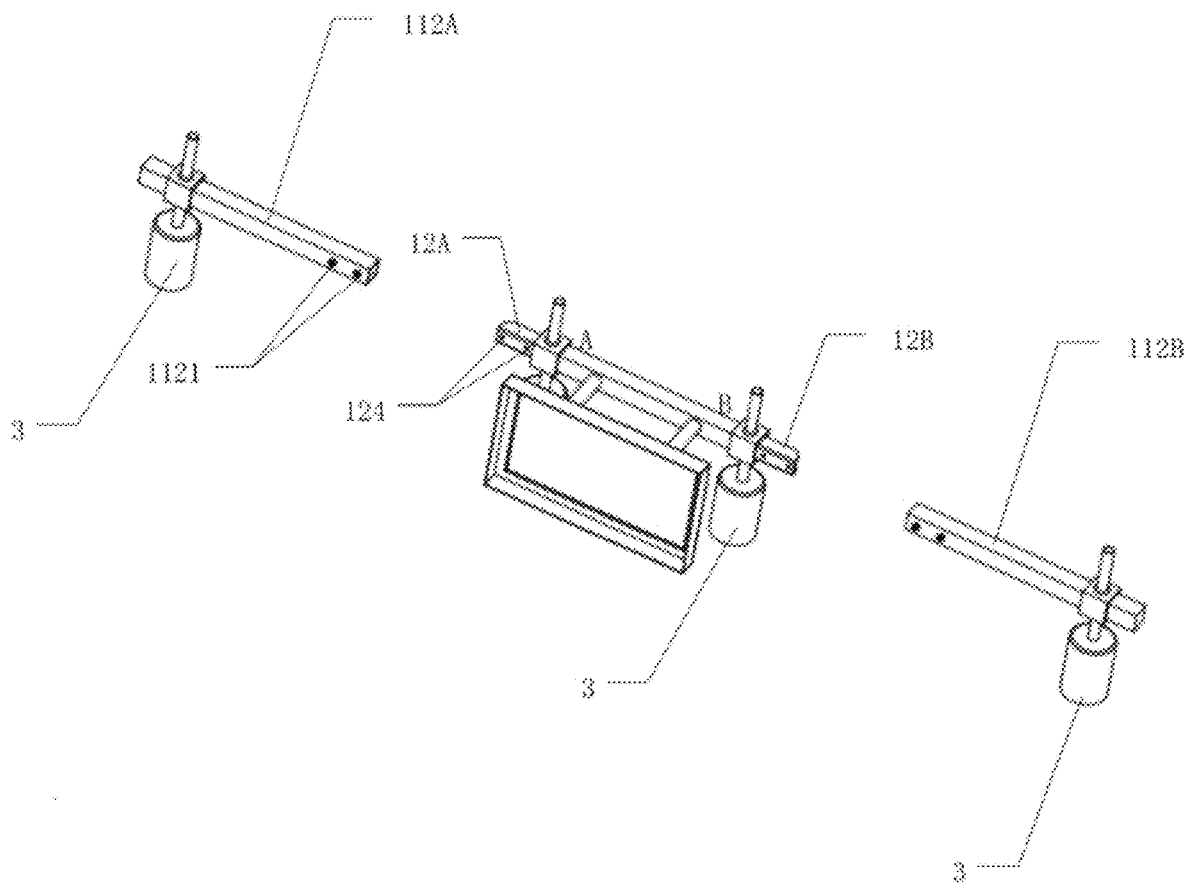
FIG. 9B shows a schematic structural diagram of the tube body connecting device in a back view before installation according to an embodiment of the present disclosure.
Figure 9C:
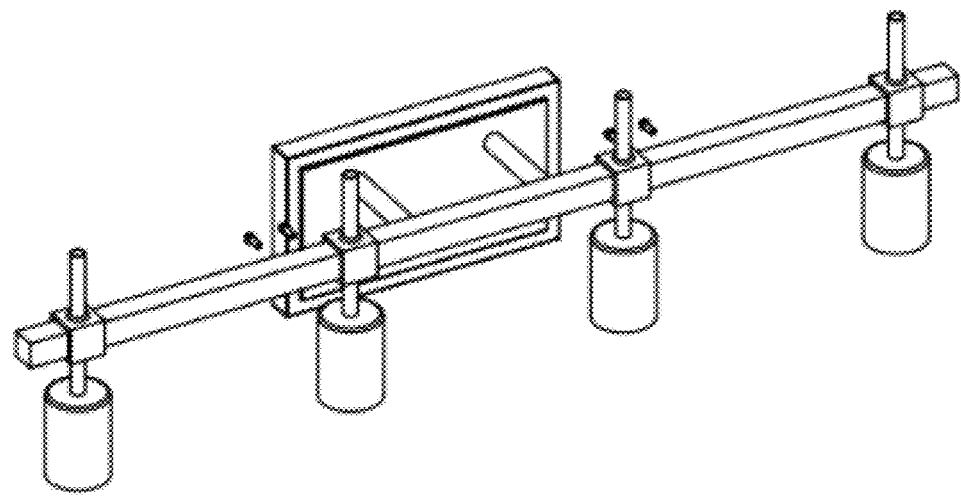
FIG. 9C shows a schematic structural diagram of the tube body connecting device in a frontal view during installation according to an embodiment of the present disclosure.
Figure 9D:
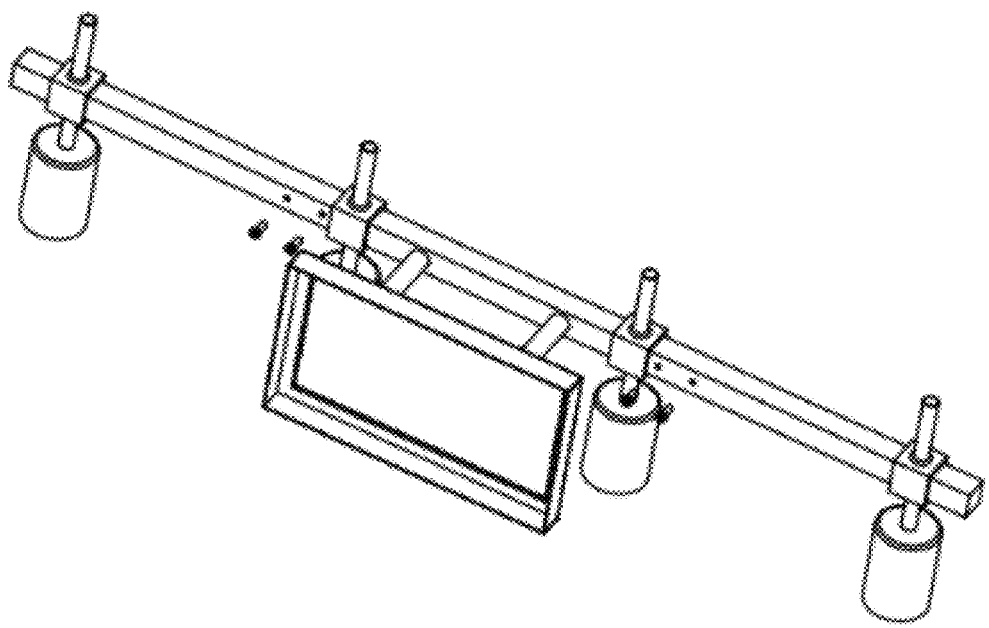
FIG. 9D shows a schematic structural diagram of the tube body connecting device in a back view during installation according to an embodiment of the present disclosure.
Figure 9E:
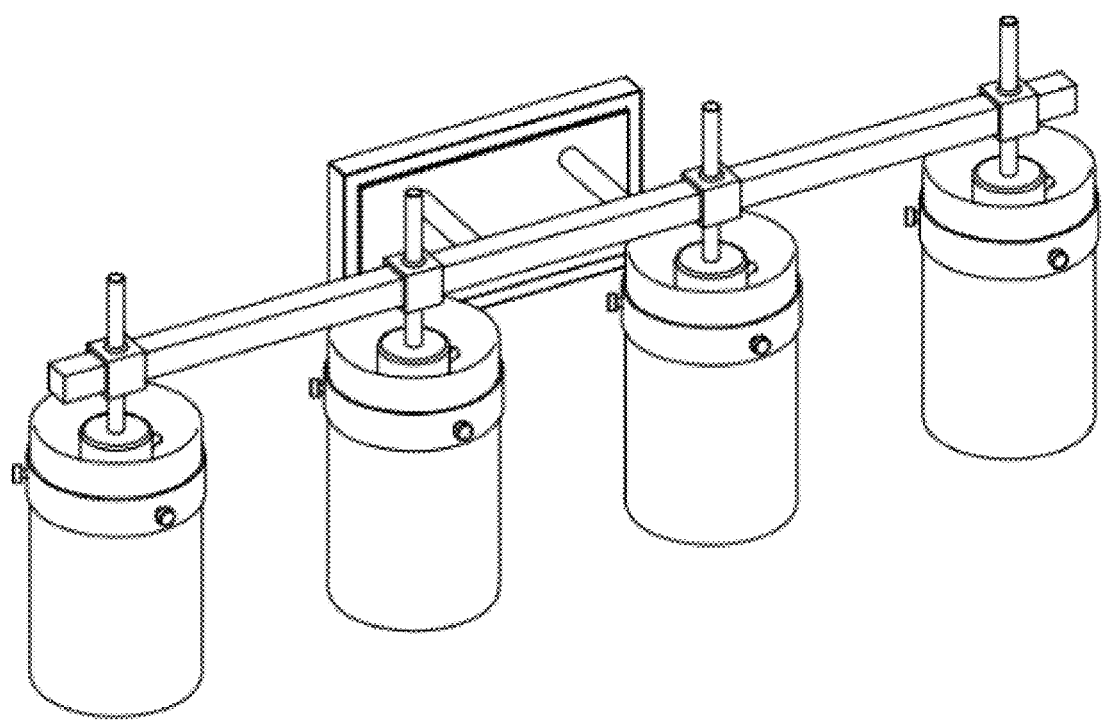
FIG. 9E shows a schematic structural diagram of the tube body connecting device in a frontal view after installation according to an embodiment of the present disclosure.
Figure 9F:
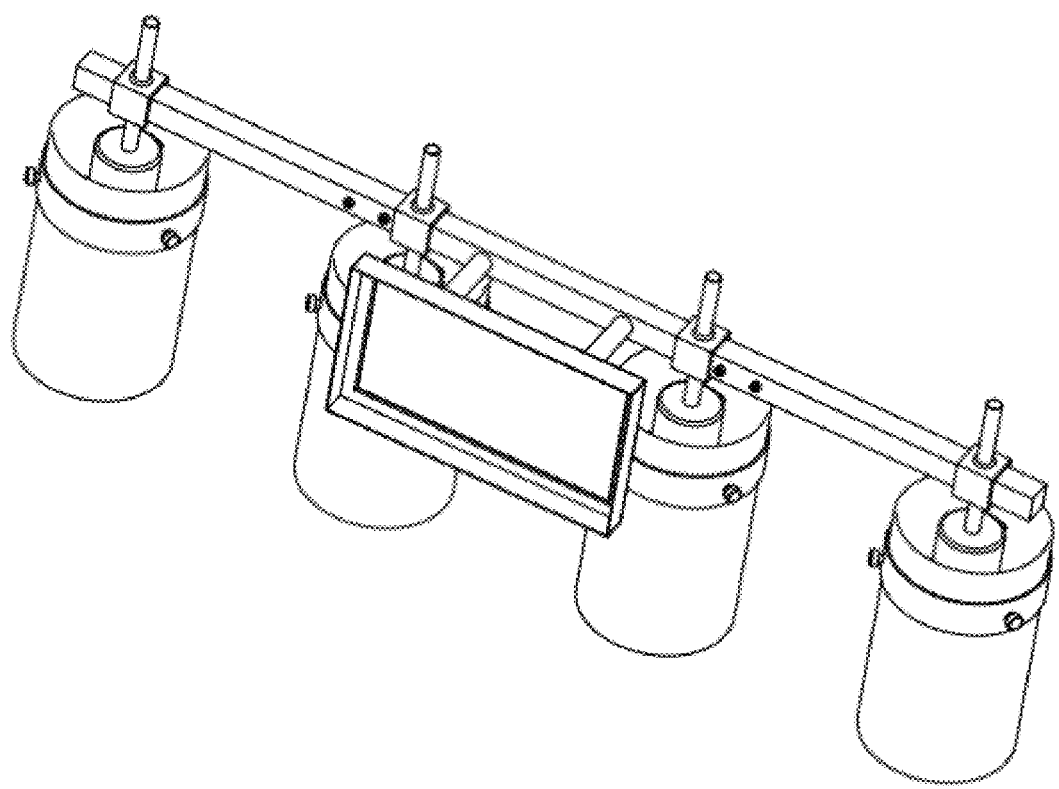
FIG. 9F shows a schematic structural diagram of the tube body connecting device in a back view after installation according to an embodiment of the present disclosure.

FIG. 9A shows a schematic structural diagram of the tube body connecting device in a frontal view before installation according to an embodiment of the present disclosure, FIG. 9B shows a schematic structural diagram of the tube body connecting device in a back view before installation according to an embodiment of the present disclosure, FIG. 9C shows a schematic structural diagram of the tube body connecting device in a frontal view during installation according to an embodiment of the present disclosure, FIG. 9D shows a schematic structural diagram of the tube body connecting device in a back view during installation according to an embodiment of the present disclosure, FIG. 9E shows a schematic structural diagram of the tube body connecting device in a frontal view after installation according to an embodiment of the present disclosure, and FIG. 9F shows a schematic structural diagram of the tube body connecting device in a back view after installation according to an embodiment of the present disclosure.

As can be seen from the above drawings, the light fixture connecting device in this embodiment includes a shared first tube body 111; two second tube bodies 112, namely: a second tube body 112A and a second tube body 112B; a first fastening mechanism 12A, a second fastening mechanism 12B; and four lamps 3. At least one first tube body hole 1111 is provided at the A end of the first tube body 111, and at least one first tube body hole 1111 is provided at the B end of the first tube body 111.

The first fastening mechanism 12A is inserted into the A end of the first tube body 111 until the first tube body holes overlap with the first end of the fastening mechanism 12. Welding is performed at the first tube body holes, so that the A end of the first tube body is fixedly connected to the first fastening mechanism 12A and the B end of the first tube body is fixedly connected to the second fastening mechanism 12B.

The first fastening mechanism 12A is then inserted into the second tube body 112A until the second tube body holes of the second tube body 112A overlap with the fastening holes 124 of the first fastening mechanism 12A, and the first fastening mechanism 12A and the second tube body 112A are secured with screws. Similarly, the second fastening mechanism 12B is inserted into the second tube body 112B until the second tube body holes 1121 of the second tube body 112B is aligned with the fastening holes 124 of the second fastening mechanism 12B, and the second fastening mechanism 12B and the second tube body 112B are secured with screws. The installation of the tube body connecting portion is completed.

Later, the lamps and the lampshades are mounted to the lamp heads, at which time, the installation of the light fixture is fully completed.

In summary, the tube body connecting device provided in the present disclosure can precisely align the holes of the first tube body and the second tube body with the holes of the fastening mechanism, thus ensuring a rapid assembly of the two tube bodies. In addition, the fastening mechanism can tightly connect the first and the second tube bodies, narrowing the gap between the two tube bodies, and can ensure the two tube bodies extend along the same axis, achieving a smooth connection. By simply inserting the fastening mechanism into the two tube bodies, a complete lighting machine can be obtained, which is easy to disassemble. The tube body connecting device provided in the present disclosure further enhances the connection strength of the tube bodies, provides a simple, labor-saving, cost-saving connection method, and moreover, because the fastening mechanism is designed inside the tubes, it makes the connecting portion of the tubes more minimalist and aesthetically pleasing. The tube body connecting device provided in the present disclosure can quickly realize the assembly of two tube bodies without changing the main structure and appearance, reduce the volume, reduce the cost of product transportation, and improve the customer experience. Moreover, the structure of this device as well as the fittings can be adjusted according to the changes in the cross-sectional size of the tube bodies, making it versatile, with a wide range of applications and high practical value.

The above embodiments are only to illustrate the principles and effects of the present disclosure, and are not intended to limit the present disclosure. Any person skilled in the art may modify or change the above embodiments without violating the spirit and scope of the present disclosure. Therefore, all equivalent modifications or changes made by a person having ordinary knowledge in the art without departing from the spirit and technical ideas disclosed in the present disclosure shall still be covered by the claims of the present disclosure.

The invention claimed is:

1. A tube body connecting device, comprising tube bodies and a fastening mechanism arranged in the tube bodies;
   wherein the tube bodies comprise a first tube body and a second tube body connected to the first tube body by the fastening mechanism; wherein the fastening mechanism has a U-shaped cross-section;
   wherein the first tube body is provided with first tube body holes, and a first end of the fastening mechanism is provided with fixed-connection holes; the first end of the fastening mechanism is inserted into the first tube body, and the first tube body and the fastening mechanism are fixedly connected by welding at the first tube body holes;
   wherein the second tube body is provided with second tube body holes, and a second end of the fastening mechanism is provided with fastening holes; and
   wherein the second tube body is connected to the second end of the fastening mechanism through the second tube body holes and the fastening holes.

2. The tube body connecting device according to claim 1, wherein the second tube body and the second end of the fastening mechanism are detachably connected by the second tube body holes and the fastening holes.

3. The tube body connecting device according to claim 1, wherein the second tube body and the second end of the fastening mechanism are in a threaded connection.

4. The tube body connecting device according to claim 1, wherein a cross-section of the first tube body matches a cross-section of the first end of the fastening mechanism.

5. The tube body connecting device according to claim 1, wherein the number of the second tube body holes is no less than two, and the number of the fastening holes is no less than two; and wherein the number and position of the second tube body holes correspond to the number and position of the fastening holes.

6. The tube body connecting device according to claim 5, wherein the second tube body comprises second tube body sidewalls; and wherein each two adjacent sidewalls of the second tube body sidewalls are connected to each other, and the second tube body holes are provided on one of the second tube body sidewalls.

7. The tube body connecting device according to claim 5, wherein the second tube body comprises second tube body sidewalls; and wherein each two adjacent sidewalls of the second tube body sidewalls are connected to each other, and the second tube body holes are provided on at least two of the second tube body sidewalls.

8. The tube body connecting device according to claim 1, wherein a cross-section of the second tube body matches a cross-section of the second end of the fastening mechanism.

* * * * *